Aug. 20, 1935.  S. E. DIESCHER  2,011,802
CROSS ROLL DELIVERY TABLE
Filed March 3, 1933    2 Sheets-Sheet 1
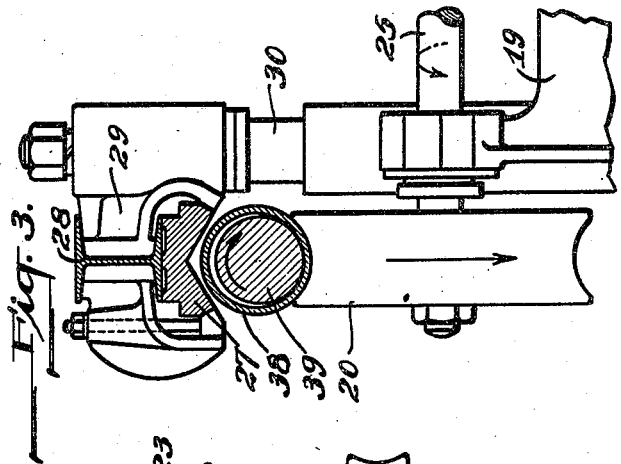
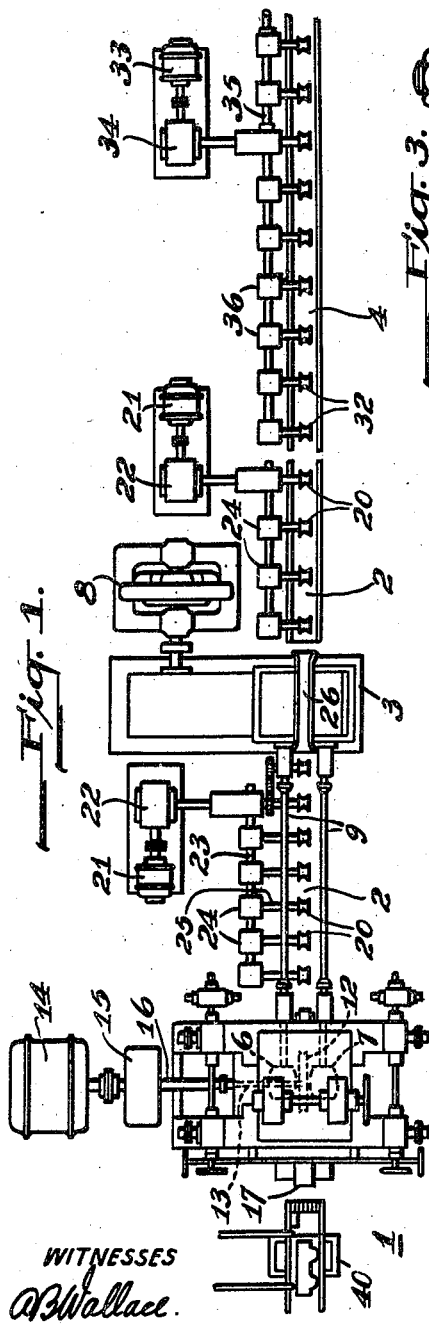
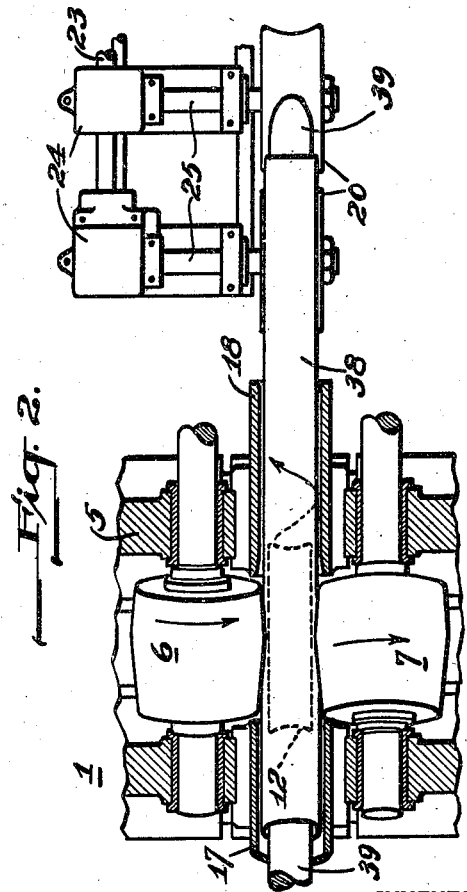
WITNESSES
OBWallace.
J.R.Langley
INVENTOR.
Samuel E. Diescher.
BY
Brown, Critchlow & Flick
ATTORNEYS.

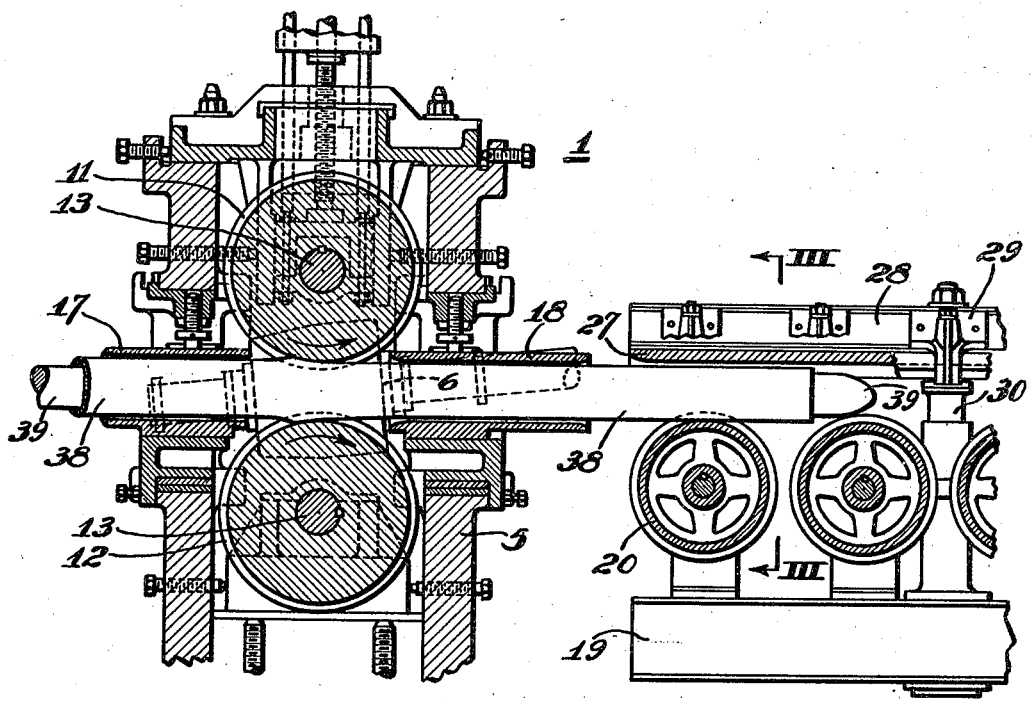

Patented Aug. 20, 1935

2,011,802

UNITED STATES PATENT OFFICE 2,011,802

CROSS-ROLL DELIVERY TABLE

Samuel E. Diescher, Pittsburgh, Pa., assignor to Diescher Tube Mills, Inc., Pittsburgh, Pa., a corporation of Delaware Application March 3, 1933, Serial No. 659,516

17 Claims. (Cl. 80—13)

My invention relates to apparatus for making tubes, and particularly to apparatus associated with cross-rolls for reducing the wall thickness of tubes.

In the operation of cross-rolls for treating tubes, and particularly tubes of the seamless type, the latter are actuated through the cross-rolls with a helical movement. A tube is advanced longitudinally while it is rotated at a relatively high speed about its longitudinal axis. When a rapidly rotating tube engages surfaces that are relatively stationary with respect to the rotative movement of the tubes, the surface of the tube is likely to become scratched, and as the frictional resistance to such rotative movement is relatively high, tubes of large diameter and thin walls are likely to become distorted, the progress of the tube is retarded and the quality of the product may be lowered.

Delivery tables that have ordinarily been employed in connection with mills of the cross-roll type, or of other types, usually comprise a series of rollers extending along the longitudinal path of movement of tubes that are received thereby. Inasmuch as the weight of the tube and the mandrel enclosed therein may be considerable, and the rate of rotation of the tube is relatively high, the resulting frictional resistance is considerable.

In the apparatus of the present invention the rollers of the delivery table rotate in the direction of movement of a tube thereon and at such angular velocity as to greatly reduce transverse friction between their surfaces and that of the rotating tube supported thereon. Transverse friction between the rollers and the rapidly rotating tube may be substantially eliminated by rotating the rollers of the delivery table at a speed so related to the speed of rotation of the tube that the peripheral speed of the rollers is approximately one-half the peripheral speed of the tube divided by the sine of the angle of the helical movement of the tube along the table.

It will be appreciated that the relatively high speed of the table rollers that is essential to a substantial reduction of transverse friction is not suitable for conveying tubes after they have completely passed through the mill, and that it is desirable to limit the period of high speed of the rollers to that during which a tubular blank is passing through the cross-rolls of the mill.

In accordance with my present invention I provide that the speed of the rollers of the delivery table may be controlled either in accordance with the load on the mill, as indicated by the energy required for the motor for driving the cross-rolls, or in accordance with the longitudinal position of the completed tube. The speed of the table rollers is automatically diminished to one suitable for conveying the tube longitudinally as soon as the tube has completely emerged from the mill.

The details of my invention will be described in connection with the accompanying drawings, in which Fig. 1 is a plan view of a mill of the cross-roll type and its associated apparatus for receiving tubes treated thereby; Fig. 2 is a view in enlarged horizontal section of a portion of the apparatus of Fig. 1; Fig. 3 is a further enlarged view in vertical section taken on line III—III of Fig. 4; Fig. 4 is a view in vertical section of the mill of Fig. 1, and a portion of the delivery table adjacent thereto; Fig. 5 is a diagrammatic view of circuits and apparatus for controlling the driving motors of the delivery table in accordance with the longitudinal position of tubes thereon; Fig. 6 is a similar view of an arrangement for controlling the motors for driving the delivery table in accordance with the load upon the motor for driving the cross-rolls.

Referring to the drawings, apparatus for making seamless tubes and apparatus constructed in accordance with my invention associated therewith comprises a mill 1 of the cross-roll type, a delivery table 2 for receiving completed tubes from the mill 1, a gear stand 3 which is located between sections of the delivery table 2, and the conveying table 4 for receiving completed tubes from the delivery table 2.

The mill 1, which may be in general similar to that shown and described in my Patent No. 1,870,209, comprises a framework 5 in which there is mounted a pair of oppositely disposed cross-rolls 6 and 7 having their axes inclined to each other and to the line of feed of a blank between them. The cross-rolls 6 and 7 are adapted to be driven from a motor 8 which supplies power through the gear stand 3 which is connected by means of spindles 9 to the cross-rolls.

Two adjustably mounted grooved guide rolls or discs 11 and 12 are mounted on shafts 13. The guide discs are arranged on opposite sides of the pass between the cross-rolls and are adapted to rotate on horizontal axes. The shafts 13 are driven by a motor 14 through a gear stand 15 and shafts 16 that are connected to the shafts 13.

The mill 1 is provided with tubular guides 17 and 18 at the inlet and outlet ends respectively of the pass between the cross-rolls 6 and 7 in order to maintain tubular blanks and the mandrels contained therein in proper alignment for passing through the mill.

The receiving table 2 comprises a stationary framework 19 upon which is mounted a series of grooved rollers 20 that are mounted for rotation upon horizontal axes that are at right angles to the path of movement of the tubes as they emerge from the mill 1. As best shown in Fig. 1, the delivery table 2 is divided in sections that are respectively located on opposite sides of the gear stand 3. The section adjacent the mill 1 is provided with any suitable number of rollers 20, seven being shown by way of example. The other section is also provided with a suitable number of rollers 20, four being shown, by way of example.

The rollers 20 of each section of the delivery table 2 are driven by an electric motor 21 through a gear stand 22, a shaft 23 and a gear mechanism 24 connected to the shaft 25 of each of the rollers 20. A hollow guide 26 that is mounted on the gear stand 3 provides a passage-way through the latter for tubes passing from one section of the delivery table to the other.

As best shown in Figs. 3 and 4, excessive lateral movements of the tubes and mandrels contained therein while on the delivery table 2 are prevented by means of a grooved member 27 which constitutes a cover for the delivery table, and which is supported by an I-beam 28 connected to brackets 29 that are mounted on posts 30 connected to the framework 19.

The conveying table 4 which is in alignment with the delivery table 2 is provided with a series of rollers 32 for receiving completed tubes from the rollers 20 of the delivery table 2. The conveying rollers 32 are driven by a motor 33 through a gear stand 34 that is connected to a shaft 35 and gear mechanisms 36.

It may be assumed that a tubular blank 38 and a mandrel 39 therein are fed to the cross-rolls of the mill 1 from a feed table 40, a portion of which is illustrated in Fig. 1. The mandrel is preferably inserted in the tubular blank to project beyond the forward end of the latter, and they enter the mill through the tubular guide 17. The tubular blank 38 and the mandrel 39 are rotated by the cross-rolls 6 and 7 and at the same time are advanced longitudinally through the tubular guide 18. A portion of the completed tube and the mandrel contained therein are shown in an intermediate position in Fig. 2.

In case the speed of the motors 21 for driving the rollers 20 is controlled in accordance with the longitudinal position of the completed tube and its mandrel, a flag switch 42, shown diagrammatically in Fig. 5, is closed by the forward end of the tube 38 at any suitable point before it engages the first roller 20 of the delivery table 2. The closing of the switch 42 completes a circuit for a coil 43 of a switch 44 for controlling a shunt circuit for two rheostats 45 that are respectively in series with the field windings 46 of the motors 21.

The opening of the switch 44 removes the shunt circuit for the rheostats, and the resultant weakening of the field strength of the motors 21, which are shunt wound, causes them to increase their speed and to drive the rollers 20 at a correspondingly increased rate. However, the sudden weakening of the field strength of the motors 21 causes them to receive a relatively heavy current, and if this exceeds a certain predetermined value the coils 47 in series therewith operate correspondingly relays 48 to re-establish the shunt circuit for the field rheostats 45. However, as soon as the value of the current falls due to the acceleration of the motor the relays 48 again open and this action continues until the motors 21 have accelerated to their maximum speed at which it is desired to operate the rollers 20.

The rollers 20 will be operated at this higher speed preferably before the tube 38 engages the initial roller 20 and the result is therefore to greatly reduce the transverse friction which would otherwise be caused by the engagement of the rapidly rotating tube with the rollers 20, which rotate in planes substantially at right angles to the direction of rotation of the tube. The rotation of the rollers at high speed exerts a force tending to assist the passage of the tube through the mill, but the tube can not assume the peripheral speed of the rollers for the reason that it is restrained by its engagement with the cross-rolls.

This operation continues until the tube has reached a predetermined point in its progress through the mill, which may be, for example, the position occupied by the tube when the rear portion of the latter has been disengaged by the mill. The flag switch 42 is then released and it opens the circuit of the coil 43 and the switch 44 closes to again establish the shunt circuit for the rheostats 45. The motors 21 are quickly brought to their lower operating speed that is suitable to convey the completed tube and the mandrel along the delivery table 2 for transfer to the conveying table 4. The mechanical arrangement of the flag switch 42 has not been illustrated, but such devices are well known in the art and it may be arranged at any suitable point for actuation and release by the completed tube.

Instead of controlling the motors 21 by the longitudinal position of the completed tube, it may be preferable under certain circumstances to control the speed of the motors 21 in accordance with the load on the motor 8 for driving the cross-rolls 6 and 7. A suitable arrangement for accomplishing this result is shown in Fig. 6, in which similar numerals designate parts corresponding to those of Fig. 5.

When the motor 8 is operated at substantially constant speed during the treating of tubular blanks and the periods therebetween, a switch 50 is closed by the controller for this motor in its final position for accelerating the motor. A coil 51 of a switch 52 is energized and the switch 52 closes an interval after the energizing of the coil that is determined by a dashpot 53 connected thereto. The delay caused by the dashpot 53 is for the purpose of permitting the current supplied to the motor 8 during starting to drop to its normal value after the motor 8 has been accelerated to substantially its operating speed.

When the switch 52 closes, the coil 43 of switch 44 is connected across a shunt 54 that is in series with the motor 8, whereby the voltage across the terminals of the coil 43 is proportional to the current supplied to the motor 8. When the tubular blank enters the rolls 6 and 7, the load upon the motor 8 will be such that the coil 43 will be energized to open the switch 44, and the motors 21 will be accelerated to their maximum operating speeds in the manner described. As in connection with the system of Fig. 5, the switches 48 operate in the manner previously described as "fluttering relays" to control the value of the current during the acceleration of the motors 21.

When the tubular blank passes through the cross-rolls 6 and 7, the load upon the motor 8 falls very materially and the current across the series shunt 54 is so small that the coil 43 permits the switch 44 to close and the motors 21 are again operated at their lower speed that is suitable for conveying the completed tube and mandrel along the delivery table.

If, however, the motor 8 operates at a higher speed after the tubular blank and its mandrel are initially engaged or "picked up" by the cross-rolls, the switch 50 for controlling the operation of the rollers 20 will be arranged to close at an intermediate position of the controller for the motor 8 in order that the rollers 20 may be accelerated before the forward end of the completed tube reaches them. The rollers 20 will operate at low speed when the load upon the cross-rolls drops by reason of the completion of the tube, as described above. The rollers 20 will again be accelerated when the controller reaches the intermediate position referred to above during the succeeding operation.

The delivery table of my invention operates automatically either in accordance with the longitudinal position of the completed tube, or in accordance with the load on the cross-rolls, as indicated by the load on the motor for driving them, to control the speeds of rollers for receiving the completed tubes and mandrels therein from a cross-roll mill. When the rollers of the delivery table are so operated that their peripheral speeds are materially higher than the longitudinal travel of the tubes received thereby, the resistance of the rollers to the relatively rapid rotation of the tubes is very materially reduced and the passage of the tubular blank through the cross-rolls is correspondingly facilitated. In addition, the forces exerted by the rollers 20 along the path of movement of the completed tube further facilitate the passage of the tube blank through the cross-rolls, as will be appreciated.

The foregoing and other advantages of the delivery table of my invention will be appreciated by those skilled in the art of constructing and operating apparatus for the treatment of tubes in mills of the cross-roll type.

I claim:

1. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, means for rotating said rollers, and means for modifying the speed of said rollers which is automatically operative when a tube is engaged in the mill for causing said rollers to rotate at a peripheral speed differing from the longitudinal speed of the tube.

2. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, means for rotating said rollers, and means for modifying the speed of said rollers which is automatically responsive to a tube being passed through the mill for causing said rollers to be rotated at a peripheral speed differing from the longitudinal speed of the tube when the tube is engaged in the mill.

3. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, means for rotating said rollers, and means for modifying the speed of said rollers which is automatically operative when a tube is engaged in the mill for causing said rollers to rotate at a peripheral speed differing from the longitudinal speed of the tube and at a different peripheral speed when the tube is discharged from the mill.

4. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, means for rotating said rollers, and means for modifying the speed of said rollers which is automatically responsive to a tube being treated for causing said rollers to be rotated at a peripheral speed differing from the longitudinal speed of the tube while engaged in the mill and at a different peripheral speed when the tube is discharged from the mill.

5. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, means for rotating said rollers, and means dependent upon the load on the cross-rolls of said mill for modifying the speed of said rollers causing said rollers to be rotated at a peripheral speed differing from the longitudinal speed of the tube when it is engaged in the mill.

6. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, and means automatically controlled for rotating said rollers at a peripheral speed in excess of the longitudinal speed of the tube while it is being treated by said cross-rolls and at a selective lower peripheral speed after the tube is disengaged from said cross-rolls.

7. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, and means automatically controlled for rotating said rollers at a sufficiently high peripheral speed while a tube thereon is being treated by said cross-rolls, whereby friction caused by the rotation of said tube in engagement with said rollers is reduced to substantially a minimum, and for actuating said rollers at a selected delivery speed after the tube is discharged from the mill.

8. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, and means automatically controlled for rotating said rollers at a peripheral speed materially in excess of the longitudinal speed of a tube thereon while the tube is being treated by said cross-rolls, whereby friction caused by the rotation of said tube in engagement with said rollers is materially reduced, and for actuating said rollers at materially reduced speed after the tube is disengaged from said cross-rolls.

9. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, a motor for driving said rollers at a speed materially in excess of the longitudinal movement of a tube thereon while the tube is being treated by said cross-rolls, whereby friction caused by rotation of said tube in engagement with said rollers is materially reduced, and means controlled by the load on the cross-rolls for varying the speed of said motor.

10. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, a motor for driving said rollers at a peripheral speed materially in excess of the longitudinal movement of a tube thereon while the tube is being treated by said cross-rolls, whereby friction caused by rotation of said tube in engagement with said rollers is materially reduced, and means controlled by the longitudinal position of said tube for varying the speed of said motor.

11. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, an electric motor for driving said rollers, and electrical means controlled by the load on said cross-rolls for causing said motor to operate said rollers at a relatively high speed to reduce friction caused by rotation of a tube in engagement therewith while the tube is being treated by said cross-rolls and to operate at a relatively low speed suitable for conveying said tube when the latter is no longer engaged by said cross-rolls.

12. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, an electric motor for driving said rollers, and electrical means controlled by the longitudinal position of a tube for causing said motor to operate said roller at a relatively high peripheral speed to reduce the friction caused by rotation of a tube in engagement therewith while the tube is being treated by said cross-rolls and to operate at a relatively low speed suitable for conveying said tube after the latter is disengaged from said cross-rolls.

13. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, an electric motor for driving said rollers, and electrical means controlled by the load on said cross-rolls for causing said motor to operate said rollers at a relatively high speed to reduce friction caused by rotation of a tube in engagement therewith while the tube is being treated by said cross-rolls and to operate at a relatively low speed suitable for conveying said tube when the latter is no longer engaged by said cross-rolls, said electrical means comprising a relay for controlling the field strength of said motor and responsive to the value of the current supplied to a motor for driving said cross-rolls.

14. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, an electric motor for driving said rollers, and electrical means controlled by the longitudinal position of a tube for causing said motor to operate said rollers at a relatively high speed to reduce the friction caused by rotation of a tube in engagement therewith while the tube is being treated by said cross-rolls and to operate at a relatively low speed suitable for conveying said tube after the latter is disengaged from said cross-rolls, said electrical means comprising a relay for controlling the field strength of said motor and responsive to the position of a switch actuated by said tube in its longitudinal movement.

15. The combination with a mill comprising cross-rolls for treating tubular blanks and from which tubes emerge with both a longitudinal and a rotative movement, of a delivery table for receiving said tubes and comprising a series of rollers for engaging said tubes as they emerge from said mill, said rollers having their axes at right angles to the longitudinal path of said tubes, and means automatically responsive to the passage of a tube through said mill for rotating said rollers at a speed materially in excess of the longitudinal movement of a tube thereon while the tube is being treated by said cross-rolls, whereby friction caused by the rotation of said tube in engagement with said rollers is materially reduced.

16. The method of producing tubes which comprises passing tubular blanks through a mill provided with cross-rolls from whence the tubes are discharged with a rotating longitudinal movement supporting the tubes as they are discharged from the mill on a series of driven supporting rollers, automatically modifying and controlling the speed of said rollers by the passage of the tubes through the mill in such a way as to cause them to rotate at a peripheral speed differing from the longitudinal delivery speed of the tubes while the tubes are engaged in the mill to reduce the rotational friction between them and said supporting roller.

17. The method of producing tubes which comprises passing tubular blanks through a mill provided with cross-rolls and from whence the tubes emerge with a rotating longitudinal movement, supporting the tubes on driven rollers as they are discharged from the mill, automatically modifying and controlling the speed of said rollers in such a way as to cause them to rotate at a peripheral speed in excess of the longitudinal speed of the tubes while the tubes are engaged in said cross-rolls to reduce the rotational friction between the tubes and said supporting rollers and at a different speed when the tubes are discharged from the mill.

SAMUEL E. DIESCHER.